United States Patent
Liao

(10) Patent No.: US 8,283,814 B2
(45) Date of Patent: Oct. 9, 2012

(54) VOICE COIL MOTOR ASSEMBLY WITH CONTAMINATION PREVENTION MEANS

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 441 days.

(21) Appl. No.: 12/713,322

(22) Filed: Feb. 26, 2010

(65) Prior Publication Data

US 2011/0012439 A1    Jan. 20, 2011

(30) Foreign Application Priority Data

Jul. 15, 2009 (CN) .......................... 2009 1 0304388

(51) Int. Cl.
*H02K 33/00* (2006.01)
*H02K 35/00* (2006.01)

(52) U.S. Cl. ............... 310/12.16; 310/12.02; 310/12.33; 359/696; 359/694; 359/814

(58) Field of Classification Search ............... 310/12.16, 310/12.02, 12.33
See application file for complete search history.

(56) References Cited

U.S. PATENT DOCUMENTS

| | | | |
|---|---|---|---|
| 7,450,834 B2 * | 11/2008 | Makii et al. | 396/55 |
| 7,586,702 B1 * | 9/2009 | Huang et al. | 359/824 |
| 2008/0007850 A1 * | 1/2008 | Huang | 310/311 |
| 2008/0037143 A1 * | 2/2008 | Yoon | 359/824 |
| 2011/0164326 A1 * | 7/2011 | Hsu | 359/691 |

* cited by examiner

*Primary Examiner* — Quyen Leung
*Assistant Examiner* — Michael Andrews
(74) *Attorney, Agent, or Firm* — Altis Law Group, Inc.

(57) ABSTRACT

A voice coil motor assembly includes a housing, a voice coil motor, a cover, and a transparent board. The voice coil motor is received in the housing. The cover is secured to the voice coil motor and resists the top surface of the housing. The cover includes a top surface defining an aperture. A limiting element protrudes from the top surface of the cover. The transparent board is adhered to the top surface of the cover and covers the aperture. The movement of the transparent board is limited by the limiting element.

10 Claims, 5 Drawing Sheets

VOICE COIL MOTOR ASSEMBLY WITH CONTAMINATION PREVENTION MEANS

BACKGROUND

1. Technical Field

The present disclosure relates to voice coil motor assemblies and, particularly, to a voice coil motor assembly capable of protecting optical elements in the voice coil motor assembly from contamination.

2. Description of Related Art

Normally, voice coil motors include a barrel for receiving optical elements. When the optical elements have been mounted in the barrel, the voice coil motor is assembled in an electronic device for example a lens module. During the procedure of assembling the electronic device, the optical elements in the barrel may be contaminated by impurities such as dusty.

Therefore, what is needed is a voice coil motor assembly capable of protecting optical elements in the voice coil motor from contamination.

BRIEF DESCRIPTION OF THE DRAWINGS

The components of the drawings are not necessarily drawn to scale, the emphasis instead being placed upon clearly illustrating the principles of a voice coil motor assembly. Moreover, in the drawings, like reference numerals designate corresponding parts throughout several views.

DETAILED DESCRIPTION

Figure 1:
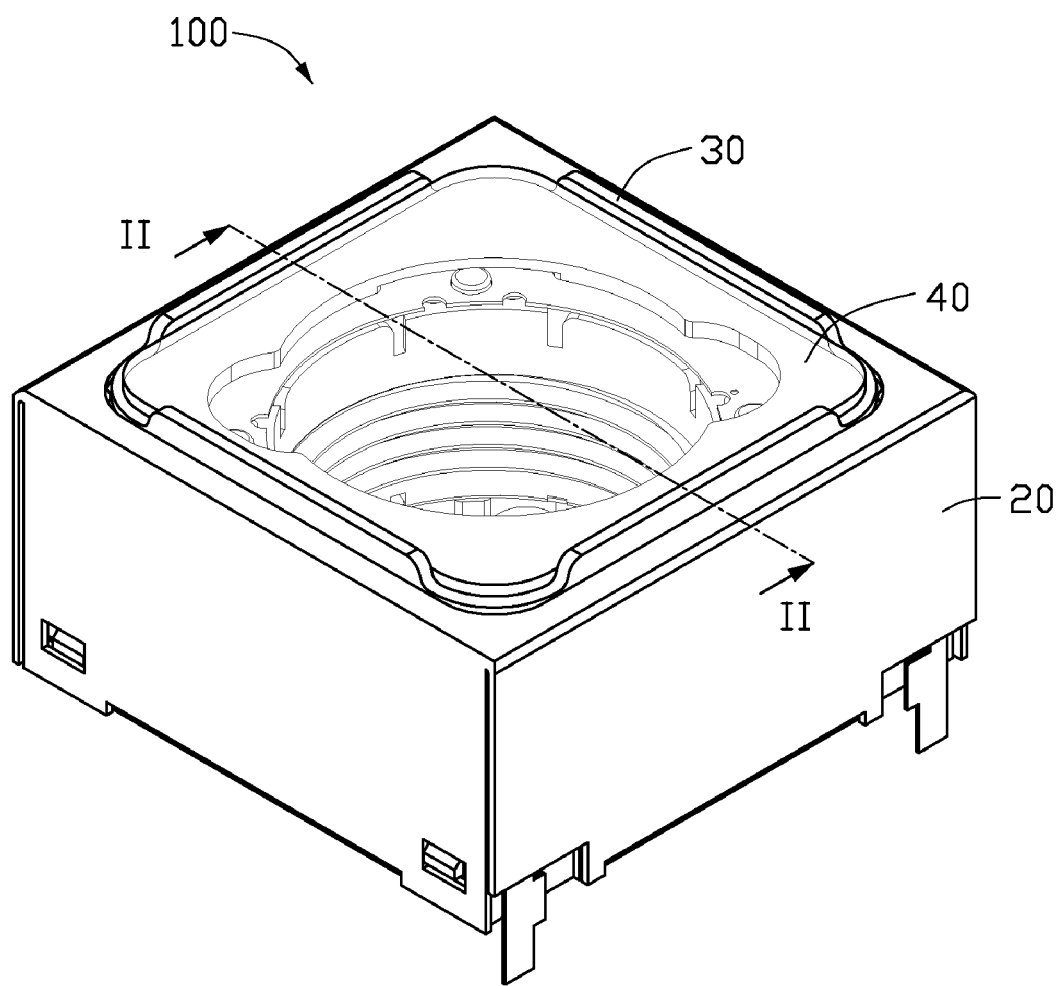
FIG. 1 is an isometric view of a voice coil motor assembly in accordance with an exemplary embodiment.
Figure 2:
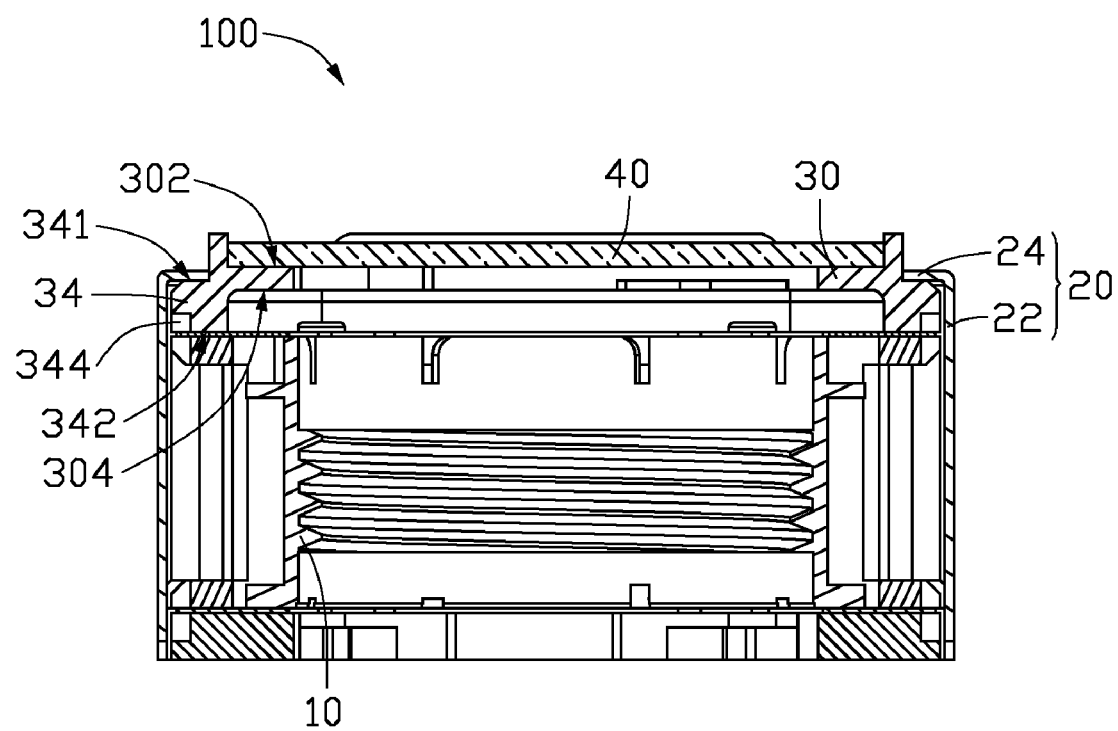
FIG. 2 is a cross-sectional view of the voice coil motor assembly of FIG. 1, taken along the line II-II.
Figure 3:
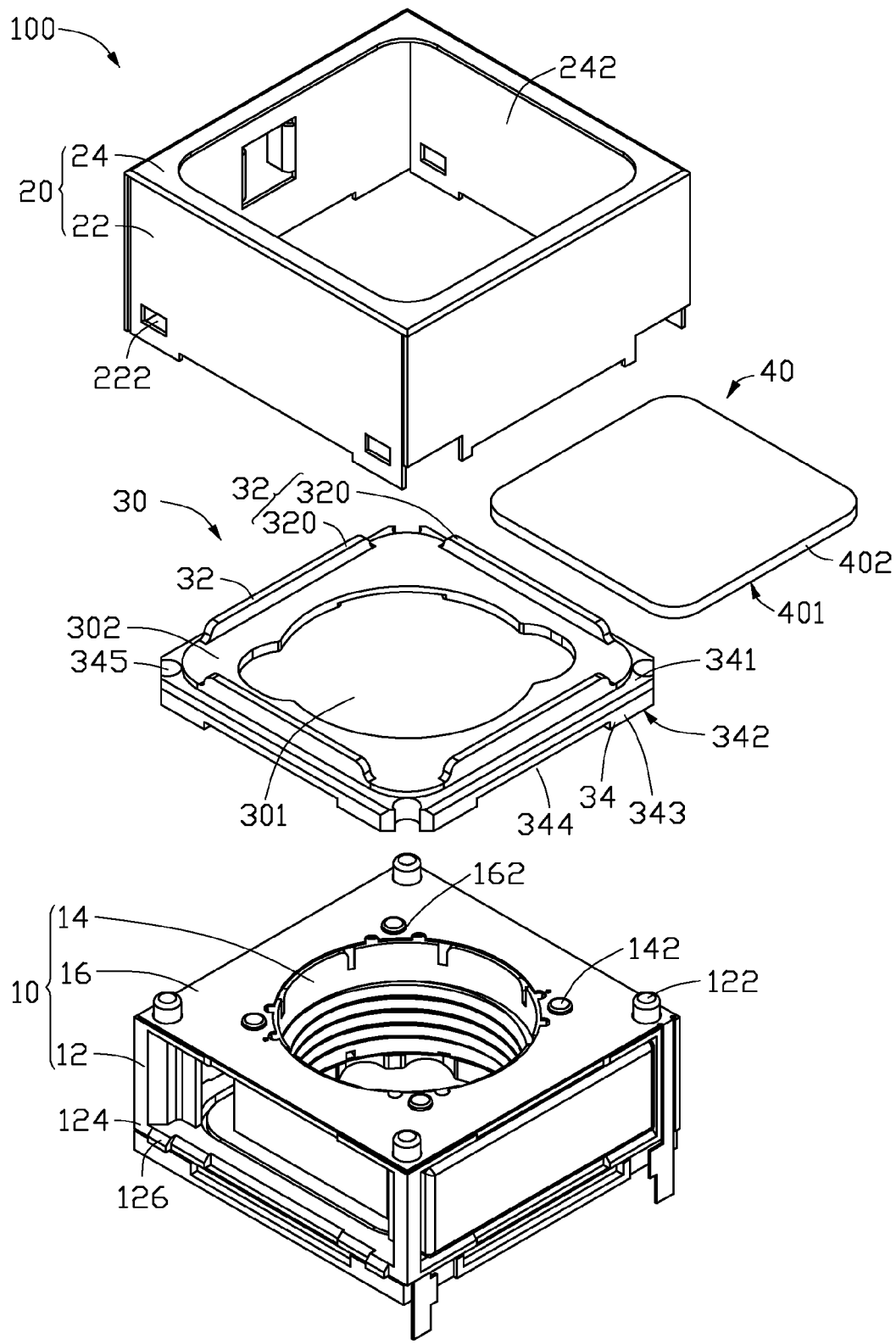
FIG. 3 is an exploded, perspective view of the voice coil motor assembly of FIG. 1.
Figure 4:
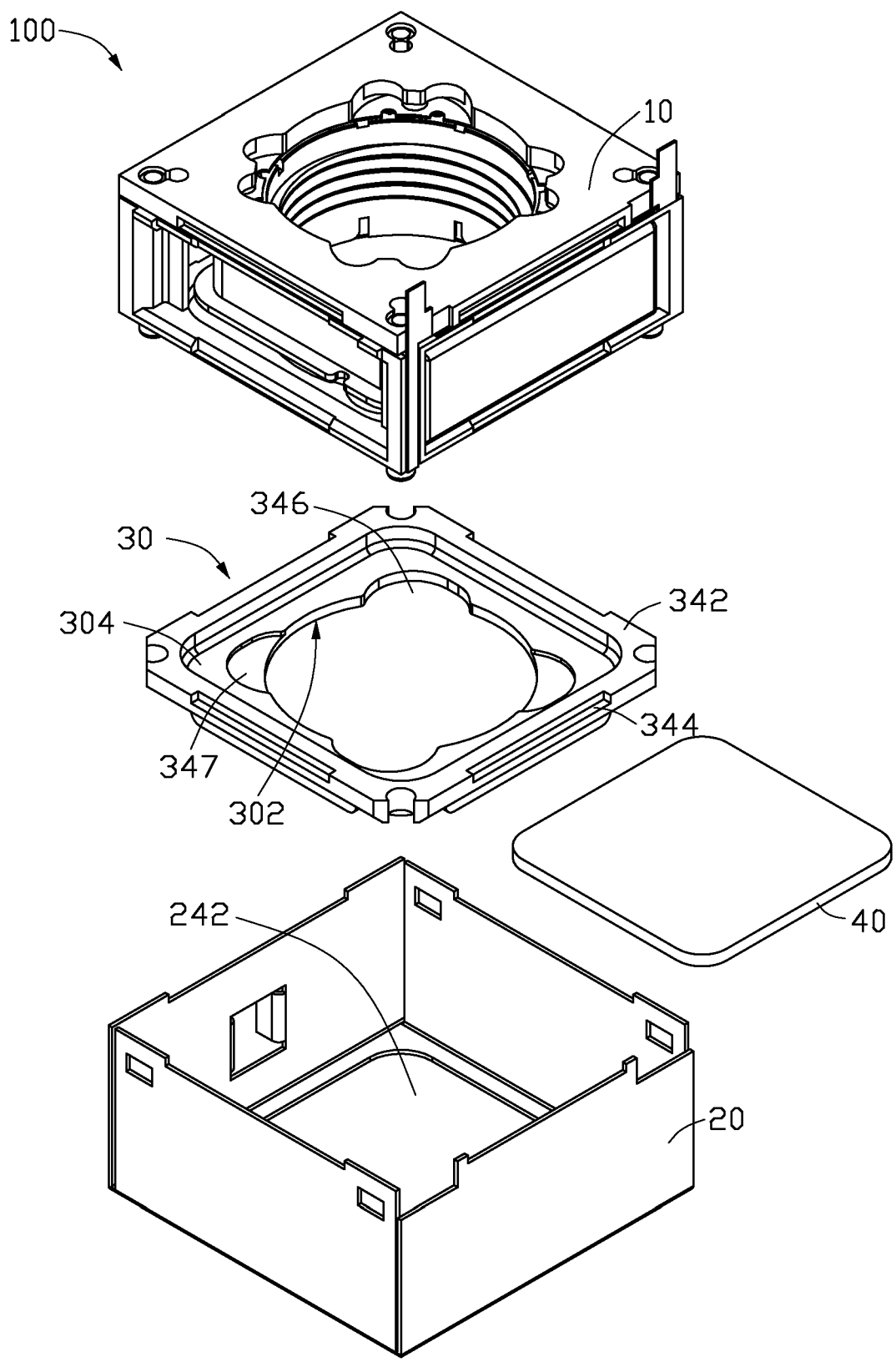
FIG. 4 is an exploded, perspective view of the voice coil motor assembly of FIG. 1, viewed from another aspect.

Referring to FIGS. 1-4, an embodiment of a voice coil motor assembly 100 is illustrated. The assembly 100 includes a voice coil motor 10, a housing 20, a cover 30, and a transparent board 40. The motor 10 is received in the housing 20 and further secured to the housing 20. The cover 30 is secured to the top of the motor 10. The board 40 is secured to the top of the cover 30 for protecting optical elements mounted in the motor 10 from contamination.

The motor 10 includes a bracket 12, a barrel 14, and a pair of elastic elements 16 (one elastic element 16 is not showed). The barrel 14 is movably mounted in the bracket 12. The elastic elements 16 are respectively secured to opposite ends of the barrel 14 for preventing damage to the barrel 14.

A pair of latching protrusions 126 protrude from each of opposite sidewalls 124 of the bracket 12. The latching protrusions 126 are configured for latching the motor 10 to the housing 20. Four positioning posts 122 protrude from the top of the bracket 12. The posts 122 are further away from the barrel 14, and are parallel with the center axis of the motor 10. The posts 122 form a rectangle. The posts 122 are configured for securing the elastic element 16 and the cover 30 to the top of the motor 10. Four fixing posts 142 are formed on the top of the barrel 14. The posts 142 form a rectangle. The elastic element 16 defines four fixing holes 162. Each of the posts 142 integrates with one fixing hole 162 to secure the elastic element 16 to the barrel 14. In the embodiment, the posts 142 are secured to the fixing holes 162 by using adhesive material or soldering.

The housing 20 includes four sidewalls 22 and a top surface 24. A pair of opposite sidewalls 22 defines a pair of through holes 222 respectively. The latching protrusions 126 extend through the through holes 222 and are latchingly engaged with the holes 222 to secure the motor 10 to the housing 20. The top surface 24 defines a receiving space 242 receiving the motor 10. In the embodiment, the housing 20 is made of metal.

The cover 30 defines an aperture 301. The center of the aperture 301 is on the center axis of the motor 10. The cover 30 includes a top surface 302 and a bottom surface 304. The aperture 301 extends through the top surface 302 and the bottom surface 304. In the embodiment, the cover 30 is made of metal.

Figure 5:
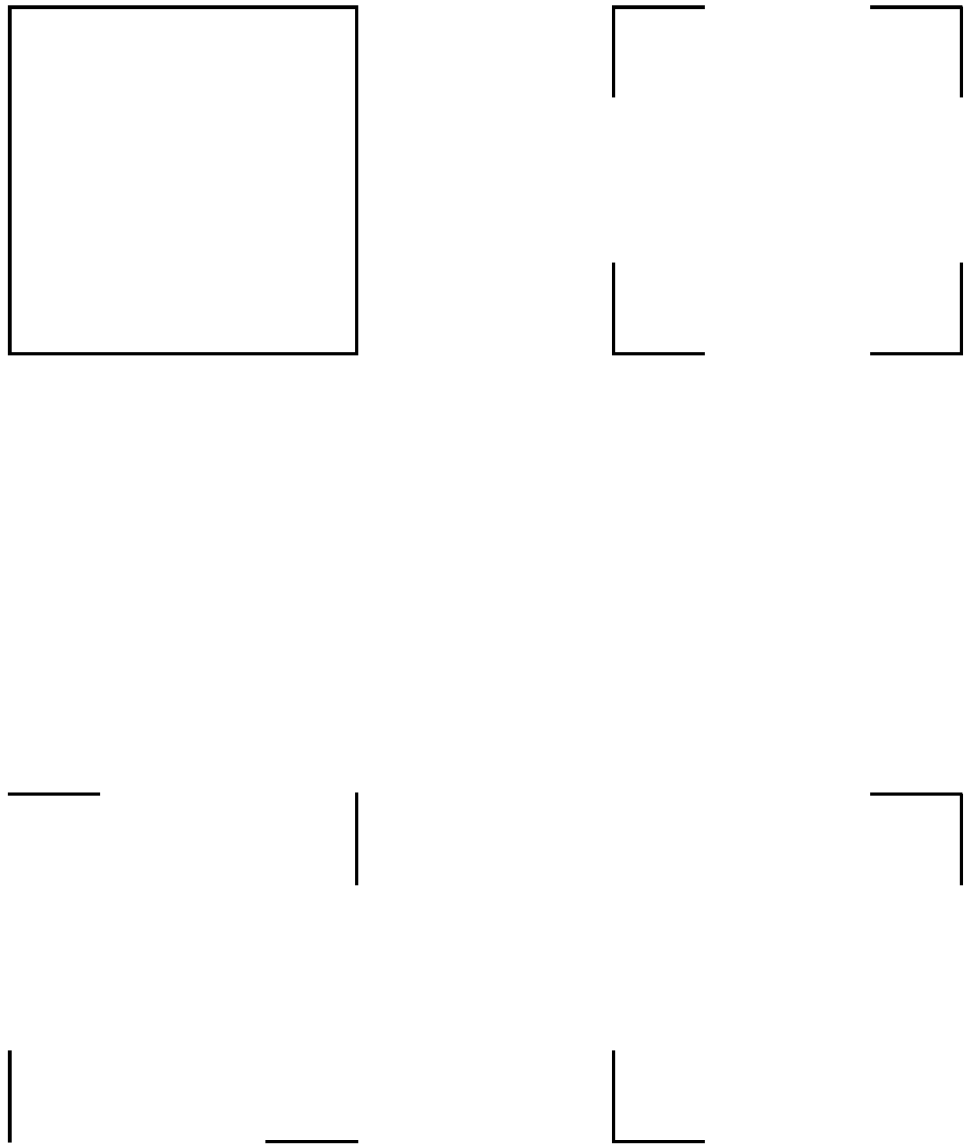
FIG. 5 is a schematic view showing different arrangement of a limiting element of the voice coil motor assembly of FIG. 1.

A limiting element 32 is formed on the top surface 341 of the cover 30 surrounding the aperture 301. The limiting element 32 is configured for limiting movement of the board 40. In the embodiment, the limiting element 32 includes four limiting projections 320. The projections 32 are exposed to the assembly 100 via the receiving space 242. The projections 32 form a space receiving the board 40. It should be noted that the limiting element 32 is not limit to the projections 320 as described above. As shown in FIG. 5, the limiting element 32 can be in different forms, for example, such as a first form of a rectangular frame, or a second form of including four L-shaped and angled projections, or a third form of including four straight projections different from the second form, or a fourth form of including a pair of opposite L-shaped and angled projections.

The cover 30 further includes a frame 34 formed around the brim of the bottom surface 304 of the cover 30. The frame 34 includes a top surface 341, a bottom surface 342, and sidewalls 343. The top surface 341 resists the top surface 24 of the housing 20, and the bottom surface 342 resists the elastic element 16. The distance between the bottom surface 342 of the frame 34 and the bottom surface 304 of the cover 30 is equal to or greater than the greatest movement distance of the motor 10, thus the barrel 14 of the motor 10 can move along its axis without resisting the bottom surface 304 of the cover 30. A slot 344 is formed in each of the sidewalls 343. The cover 30 can be secured to the motor 10 by dispersing adhesive material in the slot 344. The frame 34 defines four postholes 345. The postholes 345 are engaged with the posts 122 to secure the cover 30 to the top of the motor 10.

The bottom surface 304 of the cover 30 defines a pair of opposite first recessed portions 346 and a pair of opposite second recessed portions 347. The first recessed portions 346 spatially correspond to a pair of opposite fixing posts 142 respectively, and the second recessed portions 347 spatially correspond to another pair of opposite fixing posts 142 respectively. When the barrel 14 moves upwards along its axis, the elastic element 16 is deformed, and the adhesive material or solder around the fixing holes 162 cannot be pressed by the cover 30 due to the recessed portions 346 and 347, thus the barrel 14 can move precisely. In the embodiment, the first recessed portions 346 extend through the cover 30, and the second recessed portions 347 do not extend through the cover 30. In an alternative embodiment, all the recessed portions 346 and 347 extend through the cover 30, or do not extend through the cover 30.

The board 40 is received in the space formed by the projections 32 and secured to the cover 30 using adhesive material. The board 40 includes a bottom surface 401 and sidewalls 402. The bottom surface 401 adheres to the top surface 302 of the cover 30 and covers the aperture 301. Each of the sidewalls 402 resists one projection 320. It should be noted that the shape of the board 40 conforms to the limiting element 32.

The board 40 covers the aperture 301, thus the optical elements mounted in the barrel 14 cannot be contaminated. Furthermore, because of the simple structure and useful functioning of the limiting element 32, the procedure of mounting the board 40 to the cover 30 is relatively easier, and the board 402 is held in precise alignment and cannot slide about.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A voice coil motor assembly comprising:
a housing comprising a top surface;
a voice coil motor received in the housing;
a cover secured to the voice coil motor and resisting the top surface of the housing, wherein the cover comprises a top surface defining an aperture, a bottom surface opposite to the top surface of the cover, a limiting element protruding from the top surface of the cover, and a frame formed around the brim of the bottom surface of the cover; the frame comprises a top surface and a bottom surface, the top surface of the frame resists the top surface of the housing, and the bottom surface of the frame resists the voice coil motor; and
a transparent board adhering to the top surface of the cover and covering the aperture, the limiting element engaging with the transparent board and configured for restraining movement of the transparent board.

2. The assembly as described in claim 1, wherein the distance between the bottom surface of the frame and the bottom surface of the cover is equal to or greater than the greatest movement distance of the voice coil motor.

3. The assembly as described in claim 1, wherein the voice coil motor comprises a bracket, a barrel, and an elastic element, the barrel is moveably received in the bracket, and the elastic element is secured to a top of the barrel.

4. The assembly as described in claim 3, wherein four positioning posts protrude from a top of the bracket, and the frame of the cover defines four postholes, the positioning posts are engaged in the postholes to secure the cover to the bracket.

5. The assembly as described in claim 3, wherein four fixing posts protrude from a top of the barrel, and the elastic element defines four fixing holes, the fixing posts are engaged in the fixing holes to secure the elastic element to the top of the barrel.

6. The assembly as described in claim 5, wherein the bottom surface of the cover defines two first recessed portions and two second recessed portions, each of the first recessed portions spatially corresponds to one of two opposite fixing holes, and each of the second recessed portions spatially corresponds to one of the other fixing holes.

7. The assembly as described in claim 5, wherein each of the first recessed portions extends through the cover.

8. The assembly as described in claim 3, wherein a pair of latching protrusions protrude from each of opposite sidewalls of the bracket, and each of the opposite sidewalls of the housing defines a pair of through holes, each of the latching protrusions extends through each of the through holes and is latchingly engaged with the through hole to secure the voice coil motor to the housing.

9. The assembly as described in claim 1, wherein the top surface of the housing defines a receiving space receiving the voice coil motor, and the limiting element is exposed to the housing via the receiving space.

10. The assembly as described in claim 1, wherein the shape of the transparent board conforms to the limiting element.

\* \* \* \* \*